Sept. 16, 1941.    C. H. SHERRILL    2,255,862
BATTERY POST CLAMP
Filed May 13, 1940    2 Sheets-Sheet 1
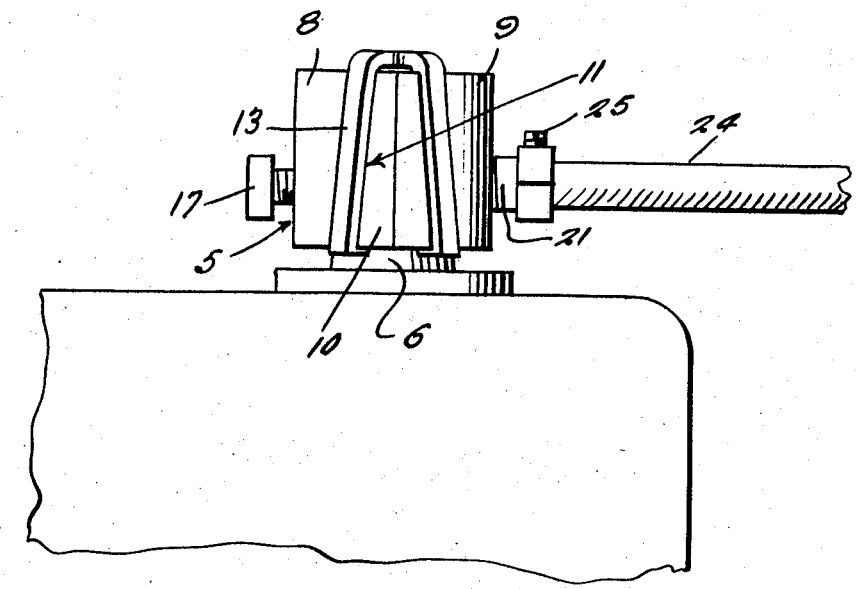
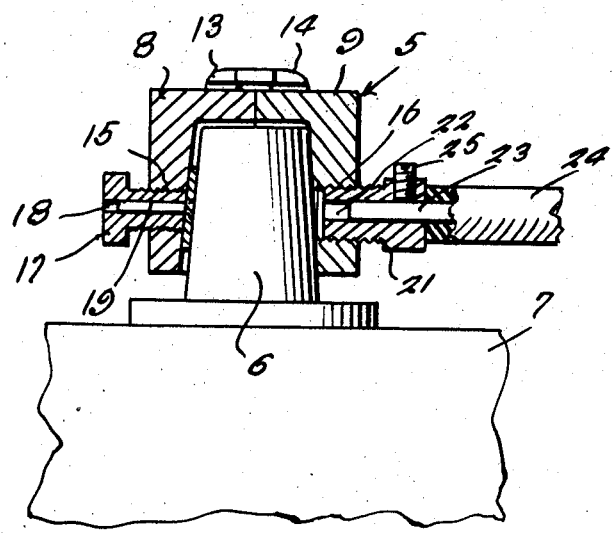
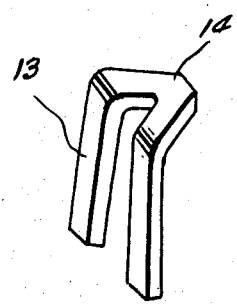
Inventor
Columbus H. Sherrill
By Clarence A. O'Brien
Attorney Sept. 16, 1941.                C. H. SHERRILL                    2,255,862
                              BATTERY POST CLAMP
                    Filed May 13, 1940              2 Sheets-Sheet 2
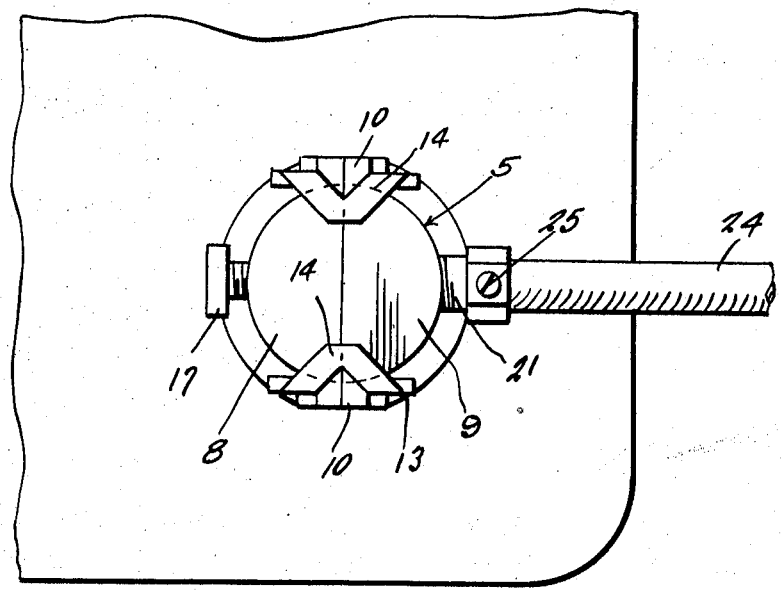
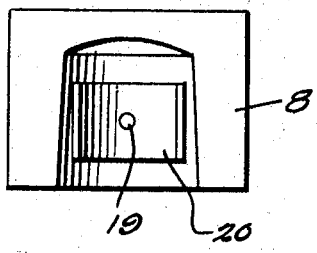
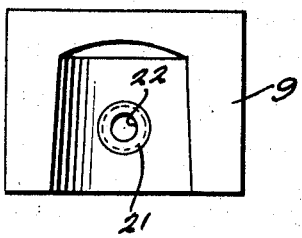
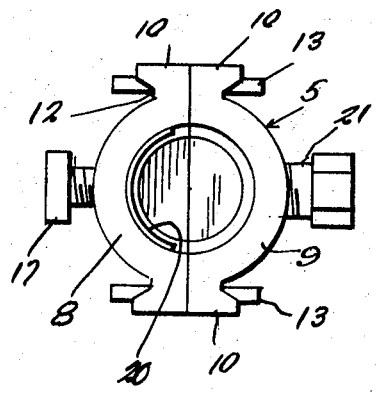
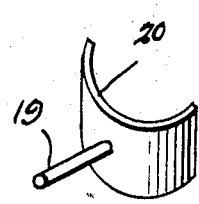
Inventor
Columbus H. Sherrill
By Clarence A. O'Brien
Attorney Patented Sept. 16, 1941

2,255,862

UNITED STATES PATENT OFFICE 2,255,862

BATTERY POST CLAMP

Columbus H. Sherrill, Berkeley, Calif.

Application May 13, 1940, Serial No. 334,884

2 Claims. (Cl. 173—259)

The present invention relates to new and useful improvements in clamps for battery posts and has for its primary object to provide a device of this character in the form of a vertically split cap having means for securing the sections of the cap to each other and also having adjustable means for tightening the cap in position on the battery post.

A further object of the invention is to provide novel means for detachably securing the battery cable to the cap.

A still further object is to provide a device of this character of simple and practical construction, which is efficient and reliable in performance, relatively inexpensive to manufacture and install in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which—

Figure 1 is a side elevational view showing the clamp in position on the battery.

Figure 2 is a top plan view.

Figure 3 is a vertical sectional view.

Figure 4 is a bottom plan view of the clamping member.

Figure 5 is a side elevational view of one section of the clamp showing the tightening plate mounted therein.

Figure 6 is a similar view of the opposite side of the clamp.

Figure 7 is a perspective view of the tightening plate, and

Figure 8 is a perspective view of one of the clips provided for securing the sections of the clamp together.

Referring now to the drawings in detail, wherein for the purpose of illustration I have disclosed a preferred embodiment of the invention, the numeral 5 designates a battery clamp in the form of a cap adapted for mounting on the battery post 6 which projects upwardly from the battery 7. The cap is constructed of a pair of duplicate sections designated at 8 and 9, respectively, the cap being split vertically, each of the sections being provided on their vertically extending outer surface, adjacent the split edge thereof with ribs 10, the ribs of the respective sections being adapted to abut each other at one side, when the sections are secured together, and the opposite vertical edges of the ribs being inclined as shown at 11.

The ribs, at their junction with the sections of the cap are provided with a channel 12 within which is adapted for insertion a substantially V-shaped clip 13, the open end of the clip extending downwardly and the closed end of the clip being bent angularly as shown at 14 and adapted to overlie the top of the cap.

Each of the sections 8 and 9 of the cap are provided with laterally extending threaded openings 15 and 16 respectively, the opening 15 having a screw 17 threaded therein and provided with a bore 18. Slidably mounted in the bore is a stem 19 formed in an arcuate shaped plate 20 conforming to the inner curvature of the section 8 of the cap and adapted to abut the side wall of the post 6 whereby to cause the plate to be pressed against the post by the tightening of the bolt 17 to cause the tight fitting engagement of the cap on the post.

Threaded in the opening 16 of the section 9 is a screw 21 also having a bore 22 therein and adapted to receive the conductor 23 of the battery cable 24. The conductor is secured in position by a set screw 25 threaded in the outer end of the screw 21.

From the foregoing it will be apparent that the parts may be easily and quickly assembled in position as shown in Figures 1, 2 and 3 of the drawings, and the clamp may then be securely attached to the battery post 6 through the manipulation of the screw 17.

It is believed the details of construction, advantages and manner of use of the device will be readily understood from the foregoing without further detailed explanation.

Having thus described the invention, what I claim is—

1. A battery post clamp comprising a vertically split sectional cap, radial wings on the split edges of the cap, clips engaging the wings and retaining the sections in assembled position on a battery post, said clips including leg portions disposed against the wings and a flat horizontal connecting portion extending inwardly of the top of the cap and bearing flatwise across the split edges thereof, said flat connecting portion forming a head adapted to be gripped by the fingers of a person for inserting and removing the clip in position on the wings and adjustable spreading means between the post and the cap for clamping the cap on the post.

2. A battery post clamp comprising a vertically split sectional cap, each section having vertically extending ribs adjacent the split edges of the cap, clips engaging the ribs and retaining the sections in assembled position on a battery post, a clamping member within the cap engageable with the post for clamping the cap thereon, a stem on the clamping member projecting outwardly of the cap and an adjusting screw threaded in one section of the cap and having a bore slidably receiving the stem, said screw engaging the clamping member to force the latter into clamping position.

COLUMBUS H. SHERRILL.